(12) United States Patent
Stuhlsatz (10) Patent No.: US 10,452,576 B2
(45) Date of Patent: Oct. 22, 2019

(54) NVME DRIVE DETECTION FROM A SAS/SATA CONNECTOR

(71) Applicant: AVAGO TECHNOLOGIES INTERNATIONAL SALES PTE. LIMITED, Singapore (SG)

(72) Inventor: Jason Stuhlsatz, Dacula, GA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 68 days.

(21) Appl. No.: 15/192,108

(22) Filed: Jun. 24, 2016

(65) Prior Publication Data
US 2017/0371814 A1   Dec. 28, 2017

(51) Int. Cl.
*G06F 13/16* (2006.01)
*G06F 13/40* (2006.01)
*G06F 13/42* (2006.01)

(52) U.S. Cl.
CPC ...... *G06F 13/1689* (2013.01); *G06F 13/4081* (2013.01); *G06F 13/4282* (2013.01); *G06F 2213/0026* (2013.01); *G06F 2213/0028* (2013.01); *G06F 2213/0032* (2013.01)

(58) Field of Classification Search
None
See application file for complete search history.

(56) References Cited

U.S. PATENT DOCUMENTS

| 7,694,029 B2 | 4/2010 | Kubo et al. | |
| 7,756,123 B1* | 7/2010 | Huang | G06F 13/4022 370/359 |
| 8,473,655 B2 | 6/2013 | Stuhlsatz et al. | |
| 2012/0297125 A1* | 11/2012 | Nasiby | G06F 3/0679 711/103 |
| 2014/0372698 A1* | 12/2014 | Lee | G06F 3/06 711/114 |
| 2015/0052275 A1 | 2/2015 | Maroney et al. | |
| 2016/0072883 A1* | 3/2016 | Long | H04L 67/1095 709/219 |
| 2016/0321200 A1* | 11/2016 | Long | G06F 13/1668 |

* cited by examiner

*Primary Examiner* — Farley Abad
*Assistant Examiner* — Dayton Lewis-Taylor
(74) *Attorney, Agent, or Firm* — Sheridan Ross P.C.

(57) ABSTRACT

Embodiments presented herein provide for hot swappable connections to various storage devices. In one embodiment, a storage controller includes an interface operable to connect to at least one of a storage device and a midplane connected to a plurality of Non Volatile Memory Express (NVMe) storage devices. The storage controller also includes a processor operable to detect when the interface is connected to the mid-plane, to determine that the NVMe storage devices each have a x4 NVMe connection, and to communicate sideband signaling, including a reference clock, to the NVMe storage devices through the midplane via Inter-Integrated Circuit (I2C) upon determining that the NVMe storage devices each have a x4 NVMe connection.

22 Claims, 5 Drawing Sheets

NVME DRIVE DETECTION FROM A SAS/SATA CONNECTOR

FIELD OF THE INVENTION

The invention generally relates to storage controllers.

BACKGROUND

The changes in data storage have seen the implementation of many different types of storage devices and protocols. Some storage devices, such as solid state drives (SSDs) are quickly taking hold in storage configurations due to their speed and lack of mechanical issues. However, traditional hard disk drives are still used due to their large storage capacities. Accordingly, storage controllers need to adapt to various types of drives, protocols, and storage configurations.

SUMMARY

Systems and methods presented herein provide for hot swappable connections to various storage configurations. In one embodiment, a storage controller includes an interface operable to connect to at least one of a storage device and a midplane connected to a plurality of Non Volatile Memory Express (NVMe) storage devices. The storage controller also includes a processor operable to detect when the interface is connected to the mid-plane, to determine that the NVMe storage devices each have a "x4" NVMe connection, and to communicate sideband signaling, including a reference clock, to the NVMe storage devices through the midplane via Inter-Integrated Circuit (I2C) upon determining that the NVMe storage devices each have a x4 NVMe connection.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. Additionally, the terms "drives" and "storage devices" used herein may be used interchangeably.

Figure 1:
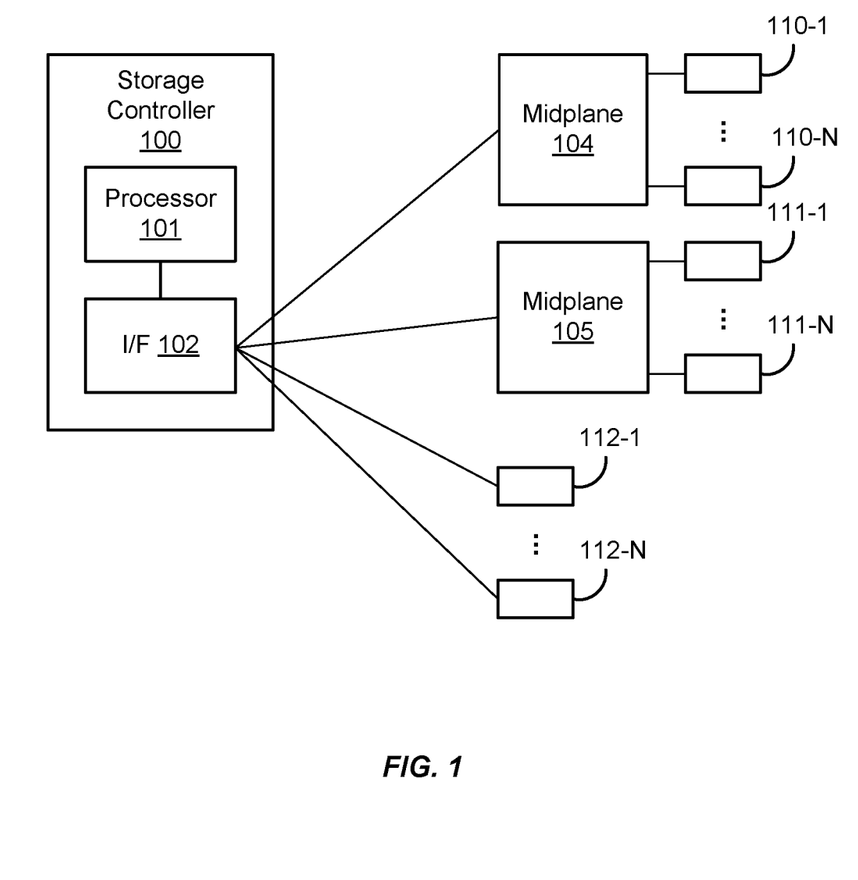
FIG. 1 is a block diagram of an exemplary storage controller operable with various storage configurations.

FIG. 1 is a block diagram of an exemplary storage controller 100. The storage controller 100 comprises a processor 101 and an interface 102 that are operable to interface with and to control storage operations of a plurality of different storage devices and configurations. For example, the interface 102 of the storage controller 100 may interface with a midplane 104 that is connected to a plurality of NVMe storage devices 110-1-110-N (where "N" is merely intended to represent an integer greater than "1" and not necessarily equal to any other "N" reference number designated herein). Each of the NVMe storage devices 110-1-110-N are connected to the midplane 104 via single "x4" NVMe connections. The interface 102 is also operable to interface with a midplane 105 that is connected to a plurality of storage devices 111-1-111-N (e.g., Serial Attached Small Computer System Interface (SAS)/Serial ATA (SATA) hard disk drives or NVMe drives) with each of the storage devices 111 comprising four independent single lane connections to the midplane 105. The interface 102 can further interface with a plurality of individual storage devices 112-1-112-N, including SAS/SATA hard disk drives or NVMe drives.

In one embodiment, the storage controller 100 is a Peripheral Component Interconnect Express (PCIe) Add-In Card (AIC) operable with a host system. The midplanes 104 and 105 are SAS/SATA midplanes. Traditionally, PCIe AICs were connected to standard SAS/SATA midplanes using connectors and cables specified in the T10 mini SAS-HD specification. This configuration was typically wired as four independent SAS lanes that route from the midplane connector to 4 SAS/SATA drives. Additional sideband connections were defined to select sideband protocoling for midplane LED operation (e.g., via Serial General Purpose Input/Output—"SGPIO" or via SCSI Enclosure Services—"SES" over Inter-Integrated Circuit—"I2C").

However, some storage devices (e.g., NVMe drives) route high speed serial lines that are normally SAS or SATA as NVMe over PCIe. And, rather than using the four independent single lane connections in a connector, the connections to the storage devices are configured as a single four lane connections. That is, one connection is operable to provide four lanes of signaling to the NVMe drive. Additionally, midplane connection for LED operation is performed by I2C, as opposed to SES over I2C. But, these drives require a shared reference clock for proper PCIe operation using Spread Spectrum Clocking (SSC), which is not implemented in SAS/SATA.

The storage controller 100 provides standard SAS cable/midplane connector sideband signaling so as to enable standard SAS/SATA operability while adding the ability to detect a x4 NVMe midplane connection and switch the sideband signaling to I2C including a reference clock. In this regard, the storage controller 100 is operable to interface with and to control storage operations of a plurality of storage configurations, including but not limited to single x4 NVMe midplane connections, 4 lane NVMe midplane connections, and SAS/SATA connections (midplane or individual devices). Various other embodiments are shown and described in greater detail below.

Figure 2:
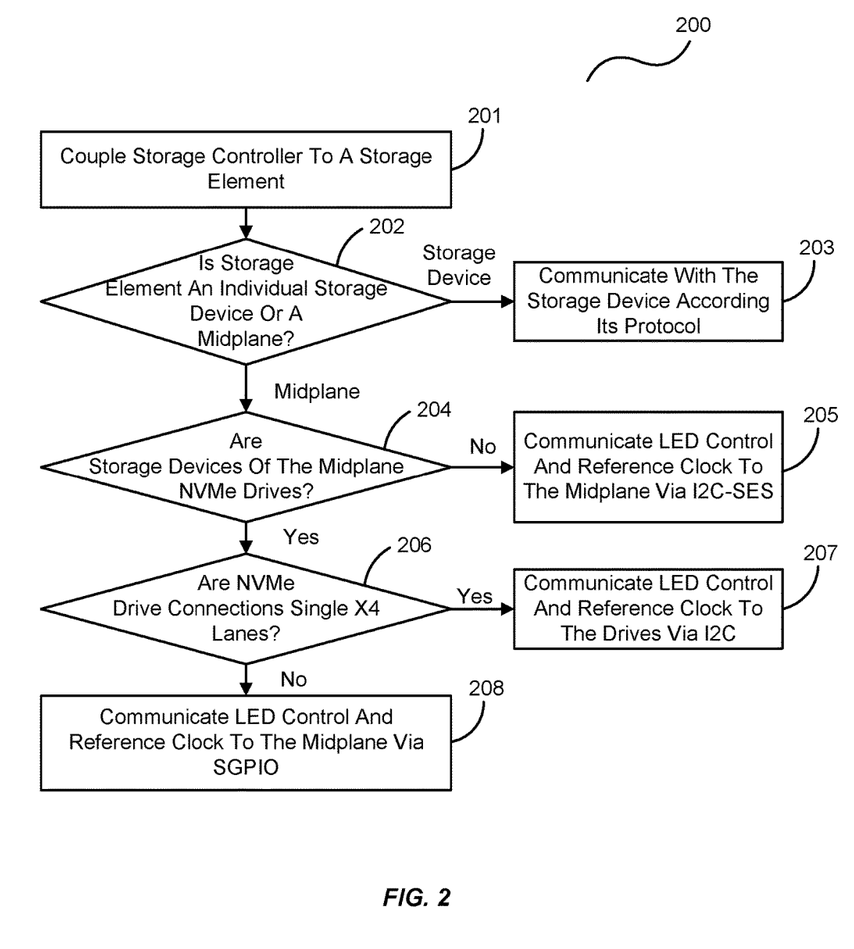
FIG. 2 is a flowchart of an exemplary process operable with the storage controller of FIG. 1.

FIG. 2 is a flowchart of an exemplary process 200 operable with the storage controller 100 of FIG. 1. In this embodiment, the process 200 initiates when the storage controller 100 is coupled to a storage element, in the process element 201. For example, the storage controller 100 may couple to a midplane 104 coupled to a plurality of NVMe drives 110-1-110-N (each having a single x4 NVMe connections), a midplane 105 coupled to another plurality of storage devices 111-1-111-N (e.g., either SAS/SATA hard disk drives or NVMe drives, each having four lane connections), and/or one or more individual storage devices 112-1-112-N, such as SAS/SATA hard disk drives and NVMe drives.

Upon coupling to the storage element, the processor 101 of the storage controller 100 determines that the storage element is an individual storage device 112 or a midplane (e.g., the midplanes 104 and 105), in the process element 202. If the processor 101 determines that the storage element is a storage device, then the processor 101 communicates with the storage device according to its protocol, in the process element 203. For example, if the storage device 112 is a SAS/SATA hard disk drive, then the processor 101 communicates with and controls storage operations of the storage device 112 via the SAS/SATA signaling. If the storage device 112 is an NVMe drive, then the processor 101 may communicate with and control storage operations of the storage device 112 via PCIe over NVMe.

If, however, the storage element is a midplane, then the processor 101 determines whether the storage devices connected to the midplane are NVMe drives, in the process element 204. If the storage devices are not NVMe drives (e.g., they are instead SAS/SATA hard disk drives), then the processor 101 communicates LED control and reference clock to the midplane 105 via I2C-SES, in the process element 205.

If the drives connected to the midplane are NVMe drives, then the processor 101 determines whether the NVMe drives comprise single x4 lane connections, in the process element 206. If so, then the processor 101 communicates LED control and reference clock information to the midplane 104 via I2C, in the process element 207. Otherwise, the storage devices 111 comprise individual connections (e.g., four individual connections) to the midplane 105 and the processor 101 communicates LED control and reference clock information to the storage devices 111 via SGPIO, in the process element 208.

Figure 3:
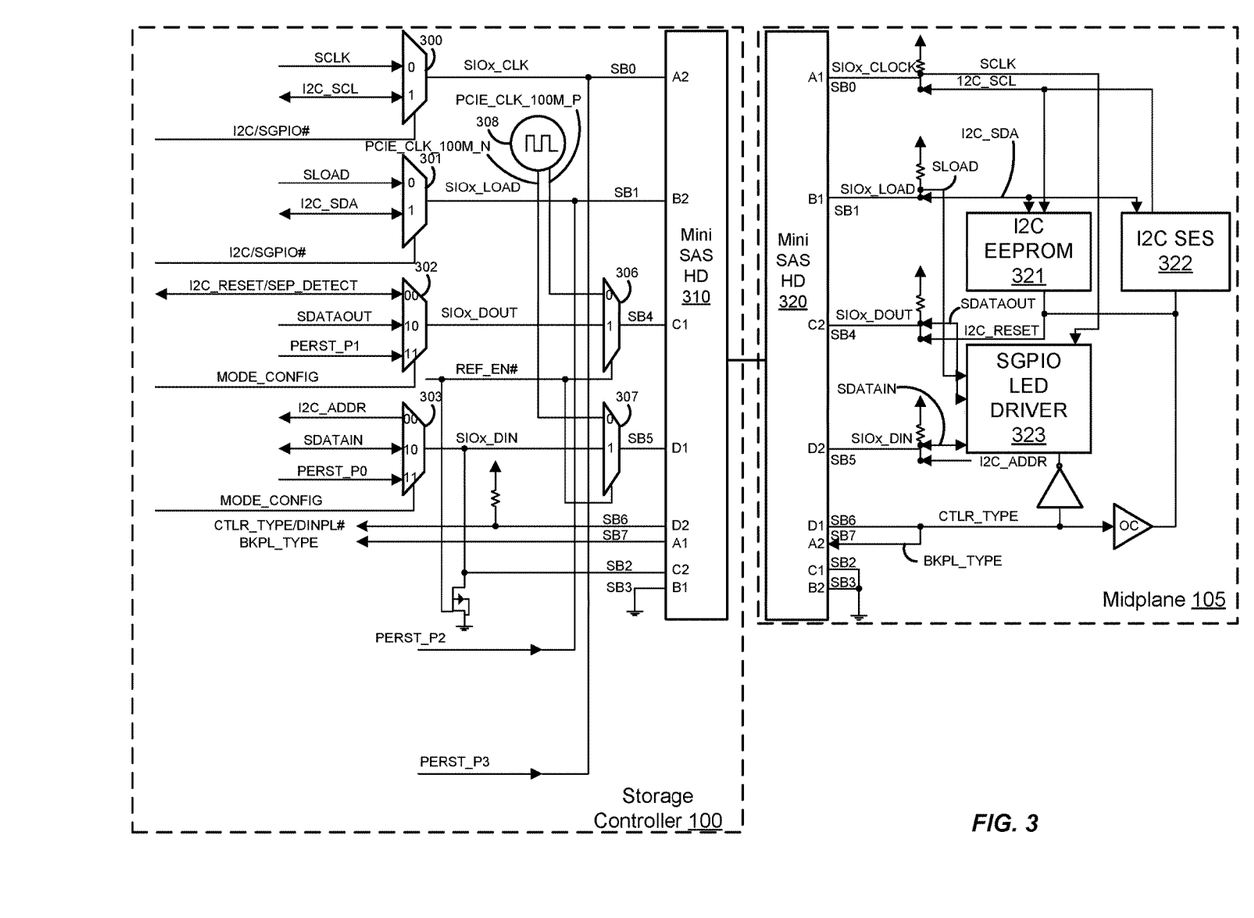
FIG. 3 is a block diagram of an exemplary storage controller coupled to a midplane having a plurality of storage devices.
Figure 4:
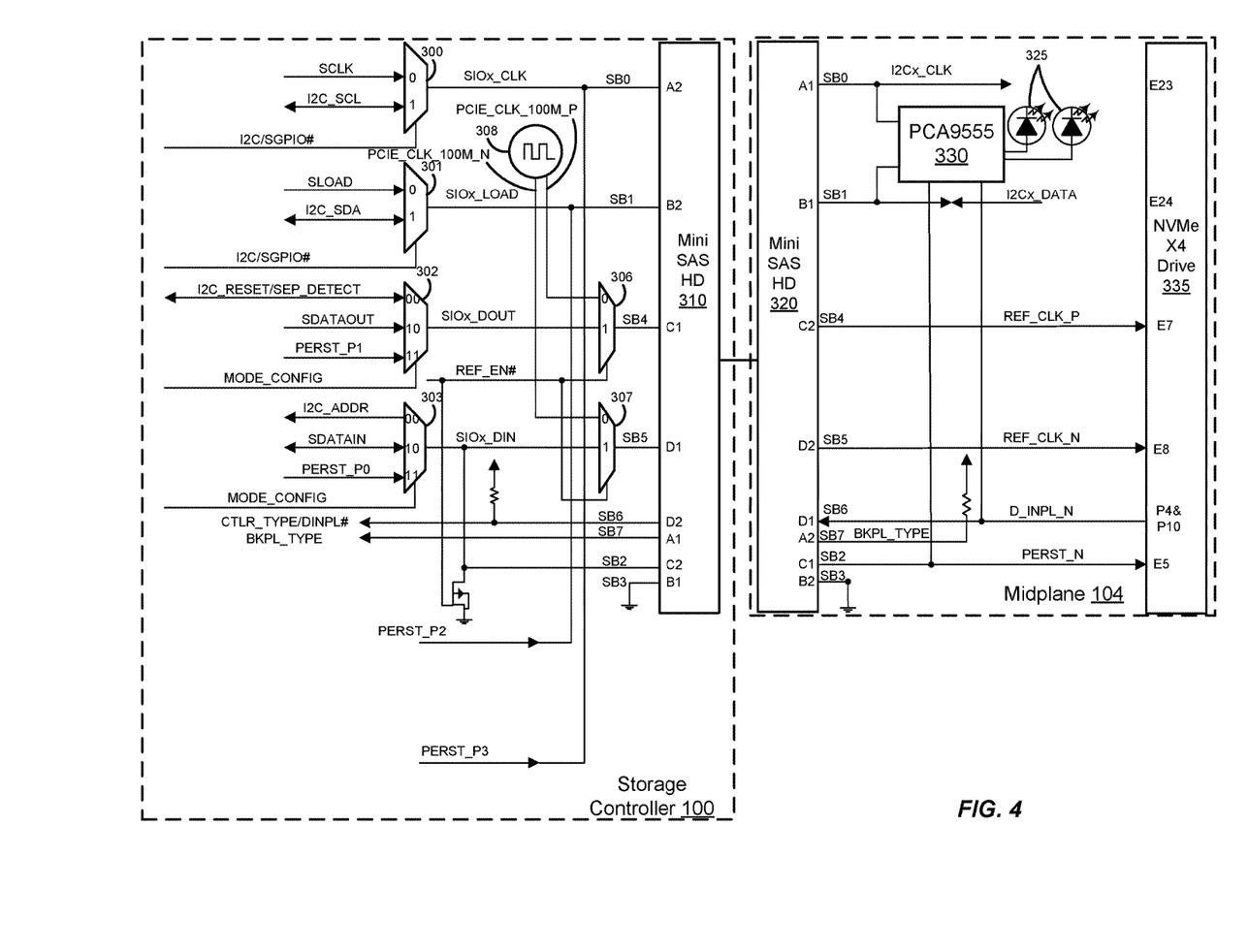
FIG. 4 is a block diagram of an exemplary storage controller coupled to another midplane having another plurality of NVMe storage devices.

To further illustrate, FIGS. 3 and 4 illustrate circuit diagrams of one exemplary embodiment of the storage controller 100 being coupled to various midplanes. More specifically, FIG. 3 illustrates an exemplary circuit diagram of the storage controller 100 being coupled to the midplane 105 via a mini SAS HD 310 interface (e.g., the interface 102 of FIG. 1). The midplane 105 is coupled to a plurality of storage devices 111-1-111-N (e.g., either SAS/SATA hard disk drives or NVMe drives) via multiple NVMe connections. That is, each storage device 111 typically comprises four individual connections to the midplane 105.

The circuitry (i.e., the processor 101 of FIG. 1) provided by the storage controller 100 implements sideband assignments and provides midplane construction of the midplane 105 for a standard SAS/SATA implementation. The multiplexers 300-303 allow the communications to the midplane 105 to switch between SGPIO and I2C-SES. When the signal REF_EN # is de-asserted (i.e., set to '1'), the multiplexers 306 and 307 on the SB4 and SB5 pins are set for SAS/SATA connection. That is, the multiplexer 302 provides the SDATAOUT and I2C_RESET for routing to the SB4 pin and the multiplexer 303 provides the SDATAIN and I2C_ADDR routing to the SB5 pin, with the connector pin SB2 being grounded. This allows for the SAS/SATA connection to communicate either to an SGPIO device (e.g., SPGIO LED driver 323 for LED control or to an I2C-SES device (e.g., the I2C EEPROM 321 and the I2C SES module 322) on the midplane 105.

FIG. 4 illustrates the same exemplary circuitry for the storage controller 100 (i.e., the processor 101) being operable to control to the midplane 104 and the storage operations of the NVMe drives 111 connected thereto. As mentioned, the midplane 104 is operable to connect to the plurality of NVMe drives 110-1-110-N via single lane x4 NVMe connections. In this embodiment, the midplane 104 comprises a mini SAS HD interface 320 to which the storage controller 100 couples via the storage controller 100's mini SAS HD interface 310.

The x4 NVMe drives 110-1-110-N use I2C communication as specified in their "Hot-Plug" standard, as well as a supplied PCIe reference clock REF_CLK (via the PCIe clock 308). The storage controller 100 provides the requisite CTLR_TYPE signal (Controller Type on SB6) to drive a controller type as an open collector output. But the storage controller 100 is also receptive to being driven low as an indication that an NVMe x4 drive 110 is connected to the midplane 104.

Upon detection that the midplane 104 is an I2C midplane rather than an SGPIO midplane, such as the midplane 105, BKPL_TYPE=1 and the CTLR_TYPE is pulled to 0 at the SB7 and SB6 pins, respectively. In this regard, the processor 101 asserts the REF_EN# signal (logic '0') that allows routing the of the reference clock signals on the unused SB4 and SB5 pins, isolating the SB2 pin from ground such that it may be used as a PCI Reset signal (PERST).

This detection mechanism indicates to the processor 101 that the specified 4 high speed lanes of the NVMe drives 110-1-110-N are routed to a single PCIe port, rather than 4 independent lanes to 4 independent SAS/SATA/NVMe ports, as with the midplane 105. The processor 101 is also able to adjust its I2C target expectations from an I2C-SES target to a simpler I2C input/output (I/O) device of the Hot Plug PCA9555 chip 330.

One exemplary firmware operation of the circuitry of the storage controller 100 (i.e., the processor 101) is as follows: The processor 101 sets CTLR_TYPE to input and pulls the line to logical "1" by default for I2C communications. Then:
If BKPL_TYPE==1 && CTLR_TYPE==0 (i.e., the 4 lanes in this group are a x4 NVMe port of an NVMe drive 110):
   set REF_EN#=0,
   assert PERST_P0,
   set PCIe phy group to x4, and
   sideband control is I2C to PCA9555;
else if BKPL_TYPE==1 && CTLR_TYPE==1:
   search for the I2C EEPROM 321, and
   read the I2C EEPROM 321 for SGPIO configuration;
   if no SGPIO configuration is detected,
     detect the I2C SES device 322, and
     operate in I2C mode;
if (BKPL_TYPE==0 || SGPIO configuration is detected):
   set CTLR_TYPE=0 for SGPIO configuration,
   if SGPIO configuration detected,
     operate SGPIO as configured,
   else
     operate in standard SGPIO mode.

The embodiments herein provide single lane NVMe SATA Express drive connect detection while not conflicting with an SGPIO detection of another midplane with dual lane routing of PCIe x2 SATA Express drives via the I2C EEPROM 321. The embodiments further leverage current SGPIO/I2C-SEP sideband assignments and detections while accommodating hot plug use of I2C on the midplane 104.

The design leverages signal assignments, ensuring that sideband assignments maintain consistency despite the different connector types specified in both the SAS and PCIe specifications (e.g., miniSAS, miniSAS-HD, OCuLink, and SlimLine). Additionally, these embodiments could be leveraged for future NVMe x4 implementations which will employ a separate reference clock (SRIS), freeing the SB4 and SB5 pins for SGPIO if the midplanes were to unite SAS/SATA and NVMe drive slots on the SGPIO protocol. Moreover, the embodiments herein are operable to provide a single AIC that can be used as a standard SAS/SATA/SATA Express RAID card, as a host bus adapter (HBA), and/or as an NVMe x4 Enterprise drive RAID storage controller.

Figure 5:
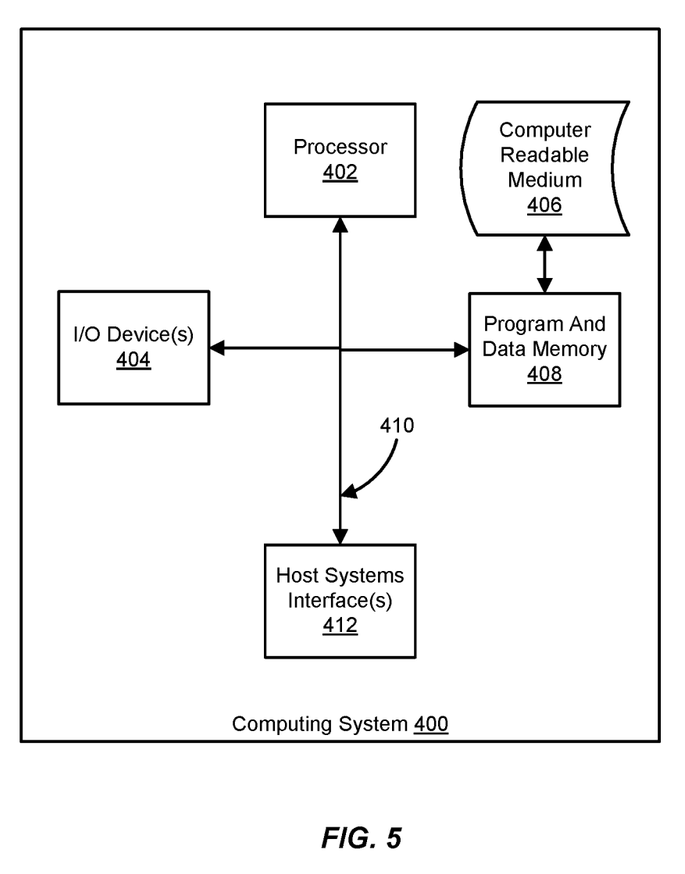
FIG. 5 illustrates an exemplary computer system operable to execute programmed instructions to perform desired functions described herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A storage controller, comprising:
an interface operable to connect to at least one of a storage device and a midplane connected to a plurality of Non Volatile Memory Express (NVMe) storage devices via an interface connection, wherein the interface connection is a single multiple lane connection to the NVMe storage devices;
a processor operable to detect if the interface is connected to the midplane or to the storage device, and when connected to the midplane, to communicate sideband signaling, including a reference clock, to the NVMe storage devices through the midplane; and
a multiplexer operable to detect a reference enable signal dependent on the interface connection,
wherein the reference enable signal is asserted when the interface is connected to the midplane, and further comprising configuring the processor to communicate with the midplane for Light Emitting Diode (LED) control of the midplane.

2. The storage controller of claim 1, wherein
the reference enable signal is deasserted when the interface is connected to another midplane connected to another plurality of NVMe storage devices, each having single lane NVMe connections, and further comprising configuring the processor to communicate sideband signaling, including a reference clock, to the other midplane via Serial General Purpose Input/Output (SGPIO) for Light Emitting Diode (LED) control of the other midplane.

3. The storage controller of claim 1, wherein
the reference enable signal is deasserted when the interface is connected to another midplane connected to a plurality of Serial Attached Small Computer System Interface (SAS)/Serial ATA (SATA) storage devices, and further comprising configuring the processor to communicate sideband signaling, including a reference clock, to the other midplane via I2C-SCSI Enclosure Services (SES) for Light Emitting Diode (LED) control of the other midplane.

4. The storage controller of claim 1, wherein:
the processor is further operable to detect when the interface is connected to the storage device, and to communicate with the storage device via Serial Attached Small Computer System Interface (SAS) protocol in addition to the communicating the sideband signaling to the NVMe storage devices through the midplane.

5. The storage controller of claim 1, wherein:
the midplane is a Serial Attached Small Computer System Interface (SAS)/Serial ATA (SATA) midplane; and
the processor is further operable to communicate with the NVMe storage devices through the midplane via a Peripheral Component Interconnect Express (PCIe) over NVMe.

6. The storage controller of claim 1, wherein:
the storage controller is a Redundant Array of Independent Disks (RAID) storage controller.

7. The storage controller of claim 1, wherein:
the storage controller is a Peripheral Component Interconnect Express (PCIe) Add-In Card (AIC) operable with a host system.

8. A method operable with a storage controller, the method comprising:
coupling the storage controller to a midplane connected to a plurality of Non Volatile Memory Express (NVMe) storage devices via an interface connection, wherein the storage controller is further operable to couple to one or more individual storage devices, wherein the interface connection is a single multiple lane connection to the NVMe storage devices;

detecting if the storage controller is connected to the midplane or to the one or more individual storage devices;

when the connection to the midplane is detected, communicating sideband signaling, including a reference clock, to the midplane; and a multiplexer operable to detect a reference enable signal dependent on the interface connection, wherein the reference enable signal is asserted when the storage controller is connected to the midplane; and further comprising communicating with the midplane via I2C for Light Emitting Diode (LED) control of the midplane.

9. The method of claim 8, wherein
the reference enable signal is deasserted when the storage controller is connected to another midplane connected to another plurality of NVMe storage devices, each having single lane NVMe connections; and
further comprising communicating sideband signaling, including a reference clock, to the other midplane via Serial General Purpose Input/Output (SGPIO) for Light Emitting Diode (LED) control of the other midplane.

10. The method of claim 8, wherein
the reference enable signal is deasserted when the interface is connected to another midplane connected to a plurality of Serial Attached Small Computer System Interface (SAS)/Serial ATA (SATA) storage devices; and
further comprising communicating sideband signaling, including a reference clock, to the other midplane via I2C-SC SI Enclosure Services (SES) for Light Emitting Diode (LED) control of the other midplane.

11. The method of claim 8, further comprising:
detecting when the storage controller is connected to a Serial Attached Small Computer System Interface (SAS)/Serial ATA (SATA) storage device; and
communicating with the SAS/SATA storage device via the SAS protocol.

12. The method of claim 8, wherein:
the midplane is a Serial Attached Small Computer System Interface (SAS)/Serial ATA (SATA) midplane; and
the method further comprises communicating with the NVMe storage devices through the midplane via a Peripheral Component Interconnect Express (PCIe) over NVMe.

13. A non-transitory computer readable medium operable with a storage controller and comprising instructions that, when executed by a processor of the storage controller, direct the processor to:
link to a midplane connected to a plurality of Non Volatile Memory Express (NVMe) storage devices via an interface connection, wherein the storage controller is further operable to couple to one or more individual storage devices, wherein the interface connection is a single multiple lane connection to the NVMe storage devices;
detect if the storage controller is connected to the midplane or to the one or more individual storage devices; and
when the connection to the midplane is detected, communicate sideband signaling, including a reference clock, to the midplane; and a multiplexer operable to detect a reference enable signal dependent on the interface connection, wherein the reference enable signal is asserted when the storage controller is connected to the midplane; and further comprising instructions that direct the processor to communicate with the midplane via I2C for Light Emitting Diode (LED) control of the midplane.

14. The computer readable medium of claim 13, wherein
the reference enable signal is deasserted when the storage controller is connected to another midplane connected to another plurality of NVMe storage devices, each having single lane NVMe connections; and
further comprising instructions that direct the processor to communicate sideband signaling, including a reference clock, to the other midplane via Serial General Purpose Input/Output (SGPIO) for Light Emitting Diode (LED) control of the other midplane.

15. The computer readable medium of claim 13, wherein
the reference enable signal is deasserted when the interface is connected to another midplane connected to a plurality of Serial Attached Small Computer System Interface (SAS)/Serial ATA (SATA) storage devices; and
further comprising instructions that direct the processor to communicate sideband signaling, including a reference clock, to the other midplane via I2C-SC SI Enclosure Services (SES) for Light Emitting Diode (LED) control of the other midplane.

16. The computer readable medium of claim 13, further comprising instructions that direct the processor to:
detect when the storage controller is connected to a Serial Attached Small Computer System Interface (SAS)/Serial ATA (SATA) storage device; and
communicate with the SAS/SATA storage device via the SAS protocol.

17. The computer readable medium of claim 13, wherein:
the midplane is a Serial Attached Small Computer System Interface (SAS)/Serial ATA (SATA) midplane; and
the computer readable medium further comprises instructions that direct the processor to communicate with the NVMe storage devices through the midplane via a Peripheral Component Interconnect Express (PCIe) over NVMe.

18. A storage controller, comprising:
an interface operable to connect to a Serial Attached Small Computer System Interface (SAS)/Serial ATA (SATA) midplane connected to a plurality of storage devices; and
a processor operable to communicate sideband signaling to Non Volatile Memory Express (NVMe) storage devices having single x4 NVMe midplane connections via Inter-Integrated Circuit (I2C), to determine that the plurality of storage devices connected to the midplane have multiple single lane connections to the midplane, and to switch to at least one of I2C-SCSI Enclosure Services (SES) and Serial General Purpose Input/Output (SGPIO) to communicate the sideband signaling to the plurality of storage devices.

19. The storage controller of claim 18, wherein:
the sideband signaling includes Light Emitting Diode (LED) control and reference clock for the midplane.

20. The storage controller of claim 18, wherein:
the plurality of storage devices comprises NVMe storage devices or SAS/SATA storage devices.

21. A method operable with a storage controller, the method comprising:

connecting to a Serial Attached Small Computer System Interface (SAS)/Serial ATA (SATA) midplane connected to a plurality of storage devices, the storage controller being operable to communicate sideband signaling to Non Volatile Memory Express (NVMe) storage devices having single x4 NVMe midplane connections via Inter-Integrated Circuit (I2C);

determining that the plurality of storage devices connected to the midplane have multiple single lane connections to the midplane; and switching to at least one of I2C-SCSI Enclosure Services (SES) and Serial General Purpose Input/Output (SGPIO) to communicate the sideband signaling to the plurality of storage devices.

22. The method of claim 21, wherein:

the sideband signaling includes Light Emitting Diode (LED) control and reference clock for the midplane.

* * * * *